3,535,384
STABILIZATION OF CHLOROACETALDEHYDES
Sidney Berkowitz, Highland Park, N.J., assignor to FMC Corporation, New York, N.Y., a corporation of Delaware
No Drawing. Filed July 28, 1967, Ser. No. 656,695
Int. Cl. C07c 47/16
U.S. Cl. 260—601   12 Claims

ABSTRACT OF THE DISCLOSURE

Stabilization of chloroacetaldehydes by minor amounts of caprolactam or other lactam.

This invention relates to stabilization of chlorinated aldehydes and, in particular, chloral and dichloroacetaldehyde which may be described by the common formula $CXCl_2CHO$ where X is H or Cl.

Chloral and dichloroacetaldehyde tend to polymerize or decompose when subjected, for example, to light, bases, water, strong acids (Lewis or Bronsted) and transition metals. The stabilization of chloral by means of certain amines and ethers has been described in the art, by Williams, Thomas and Haines in their U.S. Pats 2,504,952 and 2,504,953. These stabilizers have not, however, been entirely satisfactory.

As pointed out in the Williams et al. patents, chloral is used as an intermediate in the production of the insecticide, D.D.T. Dichloroacetaldehyde is similarly used in the preparation of an insecticidal analog of D.D.T., such as D.D.D. (dichlorodiphenyldichloroethane). In both cases the condensation of the chlorinated aldehyde with a chlorinated benzene to form the insecticide is carried out in the presence of a condensing agent such as sulfuric acid, in well known manner.

In the production of chloral and dichloroacetaldehyde these materials are often exposed to contamination by transition metals. Such metals may be present in the catalysts used in the chlorination of the acetaldehyde or they may be present in the walls of the equipment with which the chlorinated acetaldehydes come into contact during their distillation or other processing. The effects of even small amounts of these metals during storage can be quite pronounced, causing undesirable polymerization of the chlorinated acetaldehyde or darkening thereof.

In accordance with one aspect of the present invention it has been discovered that lactams, and particularly caprolactam, impart outstanding stability to chloral and dichloroacetaldehyde. The proportion of lactam may be very small; thus, amounts well below 1% are quite effective, although higher proportions (e.g. 10%) may be used if desired. In general it is practical to use an amount within the range of about 0.001 to 1% preferably within the range of about 0.05 to 0.5% (e.g. about 0.1–0.2%) of the lactam, based on the weight of the chlorinated acetaldehyde being stabilized.

By the practice of this invention it is possible to stabilize chloral and dichloroacetaldehyde for long periods of time in the presence of transition metal compounds (such as the chlorides of iron, antimony or nickel) which ordinarily cause conventional stabilizers to react and discolor the product. The invention is of particular value for the stabilization of materials in which the concentration of chlorinated acetaldehydes is high, e.g. well above 70% or 80% and preferably above 90 or 95%.

As indicated above, caprolactam is the preferred stabilizer. It is also within the scope of this invention to employ other lactams which may contain one or a plurality of lactam rings. The lactam may be completely saturated or may contain an aromatic ring or aliphatically unsaturated (e.g. ethylenic) carbon-carbon linkages. A particularly suitable class of lactams are those having a 4- to 7-membered lactam ring containing 3 to 6 carbon atoms, including such compounds of the formula

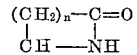

where $n$ is 1 to 4, as γ butyrolactam, δ-valerolactam and ε-caprolactam. Other lactams are those having N-substituents such as the N-alkyl lactams, e.g. N-methyl ε-caprolactam and N-methyl-δ-valerolactam. It is within the scope of the invention to use compounds having two, three or more lactam rings, such as polymeric lactams soluble in the chlorinated aldehyde. It is preferable, of course, that any substituents on the lactam not adversely affect the chlorinated aldehyde or the stabilizing properties; and the more preferred lactams consist essentially of the elements carbon and hydrogen together with the oxygen and nitrogen of the lactam ring.

The following examples are given to illustrate this invention further. In this application all proportions are by weight unless otherwise indicated.

EXAMPLE 1

In this example there is employed freshly distilled liquid chloral containing 99% chloral, 0.3% dichloroacetaldehyde, 0.2% chloroform and 0.5% carbon tetrachloride. The chloral, with or without stabilizer, is mixed with 1000 p.p.m. of ferric chloride, a known initiator of its polymerization. When no stabilizer is present the chloral turns solid within 7 days. When the chloral contains 0.1% ε-caprolactam it remains a clear, colorless liquid of unchanged analysis even after 100 days. When a commonly used amine stabilizer is employed (in proportion of 0.18%) the liquid turns a deep yellow color within about 5–10 minutes, and polymeric solids are visible in the liquid after 60 days.

EXAMPLE 2

In this example there is employed freshly distilled liquid dichloroacetaldehyde containing 85.1% dichloroacetaldehyde, 3.7% chloral, 8.9% monochloroacetaldehyde, 0.3% chloroform and about 2% HCl. When the unstabilized liquid (containing some 97.7% chloroacetaldehydes) is mixed with 1000 p.p.m. $FeCl_3$ it turns solid in 30 minutes, but when 0.1% ε-caprolactam is present, even after six weeks the liquid remains clear, although pale yellow, without any change in assay. In contrast, when a commonly used amine stabilizer is present (in proportion of 0.18%) the addition of the 1000 p.p.m. $FeCl_3$ causes the liquid to turn a dark amber color and to solidify within 14 days.

In tests in which 1000 p.p.m. of $SbCl_3$ is used in place of the $FeCl_3$, the unstabilized liquid becomes solid in 8 hours while the liquid stabilized with 0.1% caprolactam is clear and colorless, with its assay unchanged, after 6 weeks.

EXAMPLE 3

In this example the specimen of freshly distilled dichloroacetaldehyde is of relatively high assay, containing 94.4% of that compound, 5.4% of chloral, 0.2% of chloroform and a trace of HCl. When stabilized by the addition of 0.1% ε-caprolactam thereto, it remains a clear colorless liquid with no evidence of polymer on a month's storage after the addition of 1000 p.p.m. of $FeCl_3$, which causes immediate polymerization of this high assay material when the caprolactam is absent, when an amine stabilizer, mentioned in Example 2, is added to the same assay dichloroacetaldehyde undesirable side reactions occur, leading to rapid polymerization of the aldehyde.

EXAMPLE 4

Example 3 is repeated twice, using proportions of 0.4% and 10%, respectively, of the caprolactam, with similar results.

EXAMPLE 5

Example 3 is repeated using 0.2% δ-valerolactam in place of the 0.1% caprolactam, with similar results.

In each of the above examples the stabilizer dissolves readily and completely at room temperature (e.g. 20–25° C.) in the material being stabilized, and the presence of the lactam stabilizer does not adversely affect the subsequent condensation of the chlorinated acetaldehyde with a chlorobenzene in the presence of sulfuric acid to form D.D.T. or D.D.D. The stability tests in the above examples are carried out at room temperature.

It is also within the broad scope of the invention to use the lactam to improve the stability of the highly unstable monochloroacetaldehyde The condensation of the stabilized chloroacetaldehydes of this invention with chlorobenzene may be carried out in conventional manner; for example, as described in the book "DDT and Newer Persistent Insecticides" by T. F. West and G. A. Campbell, published 1952 by Chemical Publishing Co., N.Y., pages 21, 41, 42 and 43.

It is to be understood that the foregoing detailed description is merely given by way of illustration and that many variations may be made therein without departing from the spirit of the invention. The "Abstract" given above is merely for the convenience of searchers and is not to be given any weight in defining the scope of the invention.

I claim:

1. A chloroacetaldehyde stabilized with an effective amount of a lactam having a 4- to 7-membered lactam ring having 3 to 6 carbon atoms in the ring, said lactam consisting of hydrogen and carbon together with the nitrogen and oxygen of the lactam ring.

2. A chloroacetaldehyde composition as in claim 1 in which the chloroacetaldehyde has the formula

where X is hydrogen or chlorine.

3. A chloroacetaldehyde composition as in claim 2 in which the concentration of chloroacetaldehyde is at least 70% and the concentration of stabilizing lactam is in the range of about 0.01 to 1%.

4. A chloroacetaldehyde composition as in claim 2, said lactam being dissolved in the composition and being present in amount sufficient to increase the stability of said composition against the effects of the inclusion of 1000 p.p.m. $FeCl_3$ therein.

5. A composition as in claim 4 in which the lactam has the formula

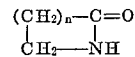

where $n$ is 1 to 4.

6. A composition as in claim 5 in which $n$ is 4.

7. A chloroacetaldehyde composition as in claim 2 in which the lactam is caprolactam.

8. A chloroacetaldehyde composition as in claim 7 in which the proportion of caprolactam is about 0.1 to 0.2%.

9. A chloroacetaldehyde composition as in claim 2 containing valerolactam.

10. A chloroacetaldehyde composition as in claim 1 which contains at least 90% of chloral.

11. A chloroacetaldehyde composition as in claim 1 which contains at least about 80% of dichloroacetaldehyde.

12. A chloroacetaldehyde as in claim 7 which contains over 90% of dichloroacetaldehyde.

References Cited

FOREIGN PATENTS 41,258  9/1965  Germany.

OTHER REFERENCES

Wertheim: Testbook of Organic Chemistry, 2nd ed., 1947, p. 245.

Cram et al.: Organic Chemistry, 2nd ed., 1964, pp. 95–96.

LEON ZITVER, Primary Examiner

R. H. LILES, Assistant Examiner